US008327695B2

(12) United States Patent
Jackson et al.

(10) Patent No.: US 8,327,695 B2
(45) Date of Patent: Dec. 11, 2012

(54) RESTRICTED FILTER DIAGNOSTIC SYSTEM AND METHOD

(75) Inventors: Robert Jackson, Brighton, MI (US);
Kurt D. McLain, Clarkston, MI (US);
Miles K. Maxey, Holly, MI (US);
Kenneth J. Kalvelage, Rochester Hills, MI (US)

(73) Assignee: GM Global Technology Operations LLC

( * ) Notice: Subject to any disclaimer, the term of this patent is extended or adjusted under 35 U.S.C. 154(b) by 421 days.

(21) Appl. No.: 12/703,952

(22) Filed: Feb. 11, 2010

(65) Prior Publication Data

US 2011/0192220 A1    Aug. 11, 2011

(51) Int. Cl.
*G01M 15/04*    (2006.01)
(52) U.S. Cl. .................................................. 73/114.37
(58) Field of Classification Search ............... 73/114.31, 73/114.32, 114.33, 114.37
See application file for complete search history.

(56) References Cited

U.S. PATENT DOCUMENTS

| | | | | |
|---|---|---|---|---|
| 4,751,501 A * | 6/1988 | Gut | ............................. | 340/607 |
| 5,606,311 A * | 2/1997 | Polidan et al. | ................ | 340/607 |
| 5,616,157 A * | 4/1997 | Mead et al. | ..................... | 96/421 |
| 7,444,234 B2 * | 10/2008 | Bauerle | .......................... | 701/114 |
| 2002/0046609 A1 * | 4/2002 | Ito | ................................... | 73/700 |
| 2003/0183206 A1 * | 10/2003 | Fujimoto et al. | ............. | 123/520 |
| 2005/0240338 A1 * | 10/2005 | Ardisana | ...................... | 701/114 |
| 2008/0190177 A1 * | 8/2008 | Wiggins et al. | ................ | 73/49.7 |

\* cited by examiner

*Primary Examiner* — Eric S McCall

(57) ABSTRACT

A restriction diagnostic system for a vehicle comprises a pressure difference module and a diagnostic module. The pressure difference module determines a pressure difference between an ambient air pressure and a filtered air pressure measured at a location between an air filter and a valve that is selectively opened to enable ambient airflow through the air filter to a fuel vapor canister. The diagnostic module selectively diagnoses restriction of the airflow through the air filter when the pressure difference is greater than a predetermined pressure.

32 Claims, 3 Drawing Sheets

RESTRICTED FILTER DIAGNOSTIC SYSTEM AND METHOD

FIELD

The present disclosure relates to internal combustion engines and more particularly to fuel systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel of the air/fuel mixture may be a combination of liquid fuel and vapor fuel. A fuel system is used to supply liquid fuel and vapor fuel to the engine. A fuel injector provides the engine with liquid fuel drawn from a fuel tank. A purging system provides the engine with fuel vapor drawn from a canister.

Generally, liquid fuel is contained within the fuel tank. In some circumstances, the liquid fuel may vaporize and form fuel vapor. The canister stores the fuel vapor. The purge system includes a purge valve and a vent valve. Operation of the engine causes a vacuum (low pressure relative to atmospheric pressure) to form within an intake manifold of the engine. The vacuum within the intake manifold and selective actuation of the purge and vent valves allows the fuel vapor to be drawn into the intake manifold, thereby purging the fuel vapor from the vapor canister.

SUMMARY

A restriction diagnostic system for a vehicle comprises a pressure difference module and a diagnostic module. The pressure difference module determines a pressure difference between an ambient air pressure and a filtered air pressure measured at a location between an air filter and a valve that is selectively opened to enable ambient airflow through the air filter to a fuel vapor canister. The diagnostic module selectively diagnoses restriction of the airflow through the air filter when the pressure difference is greater than a predetermined pressure.

A restriction diagnostic method for a vehicle comprises determining a pressure difference between an ambient air pressure and a filtered air pressure measured at a location between an air filter and a valve that is selectively opened to enable ambient airflow through the air filter to a fuel vapor canister, and selectively diagnosing restriction of the airflow through the air filter when the pressure difference is greater than a predetermined pressure.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1:
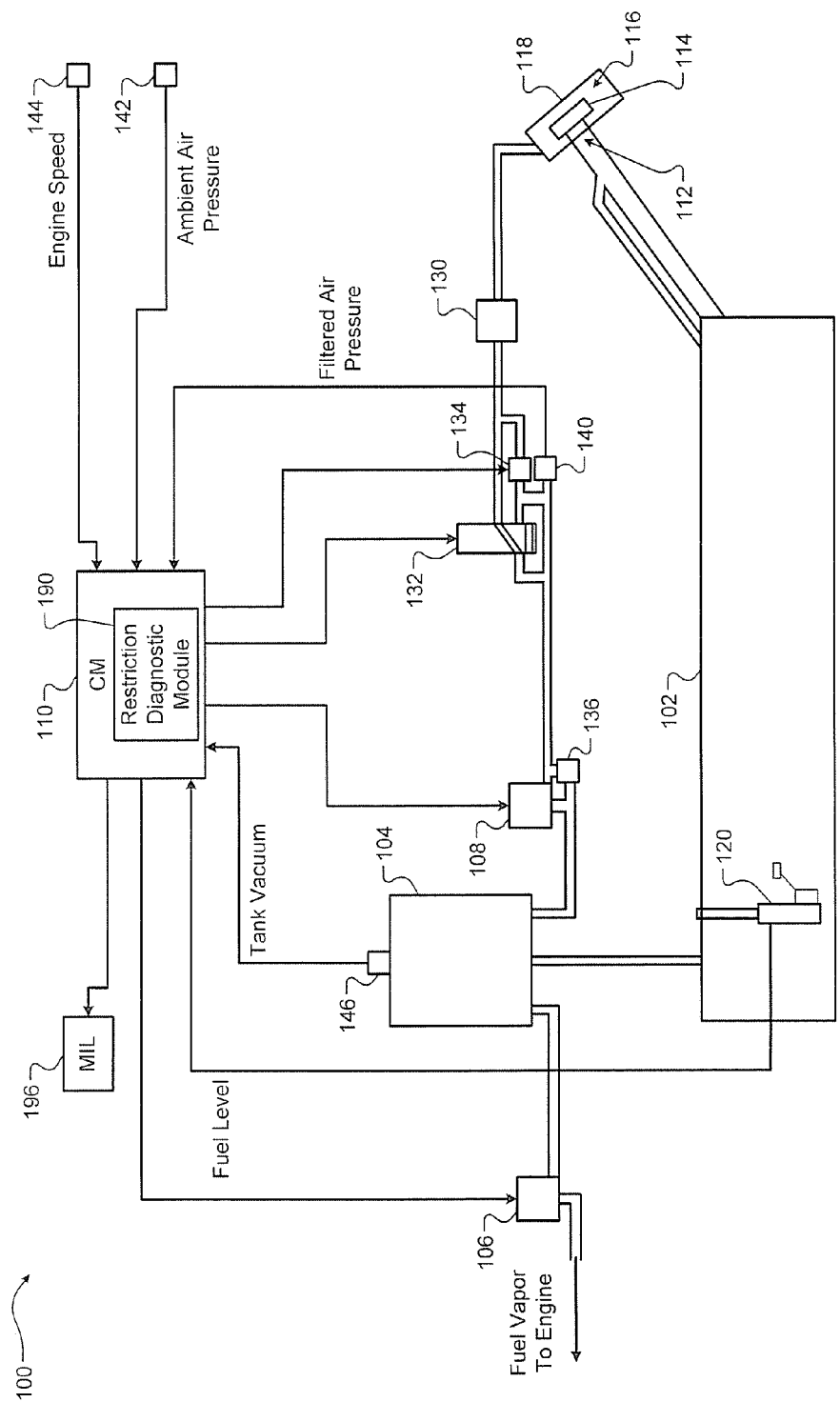
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A vapor canister traps and stores fuel vapor. A purge valve and a vent valve (e.g., a diurnal valve) are selectively opened to purge the fuel vapor from the vapor canister to an internal combustion engine. When the purge valve is open, a vacuum that forms within an intake manifold of the engine draws the fuel vapor from the vapor canister through the purge valve. The drawing of fuel vapor from the vapor canister draws ambient air through a filter and the open vent valve to the vapor canister.

The filter filters various particulate from the ambient air as the ambient air flows through the filter. Over time, particulate filtered by the filter may accumulate and may restrict the flow of the ambient air through the filter. A control module (CM) selectively diagnoses restriction of the airflow through the filter based on a pressure difference across the filter. For example only, the CM selectively diagnoses the restriction of the airflow through the filter when the pressure difference is greater than a predetermined pressure.

Referring now to FIG. 1, a functional block diagram of an exemplary fuel system 100 is presented. A vehicle includes an internal combustion engine (not shown) that generates drive torque. For example only, the engine may be a gasoline-type engine, a diesel-type engine, and/or another suitable type of engine. The engine combusts a mixture of air and fuel within one or more cylinders of the engine to generate torque.

In some vehicles, torque generated by the engine may be used to propel the vehicle. In such vehicles, torque output by the engine may be transferred to a transmission (not shown), and the transmission may transfer torque to one or more wheels of the vehicle.

In other vehicles, such as parallel-hybrid vehicles, torque output by the engine may not be transferred to the transmission. Instead, torque output by the engine may be converted into electrical energy by, for example, a motor-generator or a belt alternator starter (BAS). The electrical energy may be provided to the motor-generator, to another motor-generator, to an electric motor, and/or to an energy storage device. The electrical energy may be used to generate torque to propel the vehicle. Some hybrid vehicles may also receive electrical energy from an alternating current (AC) power source, such as a standard wall outlet. Such hybrid vehicles may be referred to as plug-in hybrid vehicles.

The fuel system 100 supplies fuel to the engine, such as an engine of a plug-in hybrid vehicle. More specifically, the fuel system 100 supplies liquid fuel and fuel vapor to the engine. While the fuel system 100 may be discussed as it relates to a plug-in hybrid vehicle, the present disclosure is also applicable to other types of vehicles having an internal combustion engine.

The fuel system 100 includes a fuel tank 102 that contains liquid fuel. Liquid fuel is drawn from the fuel tank 102 by one or more fuel pumps (not shown) and is supplied to the engine. Some conditions, such as heat, vibration, and radiation, may cause liquid fuel within the fuel tank 102 to vaporize. A canister 104 traps and stores vaporized fuel (i.e., fuel vapor). For example only, the canister 104 may include one or more substances that store fuel vapor, such as charcoal.

Operation of the engine creates a vacuum within an intake manifold (not shown) of the engine. A purge valve 106 and a vent valve 108 may be selectively operated (e.g., opened and closed) to draw fuel vapor from the canister 104 to the intake manifold for combustion. More specifically, operation of the purge valve 106 and the vent valve 108 may be coordinated to purge fuel vapor from the canister 104. A control module (CM) 110, such as an engine control module (ECM) controls the operation of the purge valve 106 and the vent valve 108 to control the provision of fuel vapor to the engine.

At a given time, the purge valve 106 and the vent valve 108 may each be in one of two positions: an open position or a closed position. The CM 110 may enable the provision of ambient air to the canister 104 by actuating the vent valve 108 to the open position. While the vent valve 108 is in the open position, the CM 110 may selectively command the purge valve 106 to the open position to purge fuel vapor from the canister 104 to the intake manifold. The CM 110 may control the rate at which fuel vapor is purged from the canister 104 (i.e., a purge rate). For example only, the purge valve 106 may include a solenoid valve, and the CM 110 may control the purge rate by controlling duty cycle of a signal applied to the purge valve 106.

The vacuum within the intake manifold draws fuel vapor from the canister 104 through the purge valve 106 to the intake manifold. The purge rate may be determined based on the duty cycle of the signal applied to the purge valve 106 and the amount of fuel vapor within the canister 104. Ambient air is drawn into the canister 104 through the open vent valve 108 as fuel vapor is drawn from the canister 104. The vent valve 108 may also be referred to as a diurnal valve.

The CM 110 actuates the vent valve 108 to the open position and controls the duty cycle of the purge valve 106 during operation of the engine. When the engine is shut down and not running (e.g., key OFF), the CM 110 actuates the purge valve 106 and the vent valve 108 to their respective closed positions. In this manner, the purge valve 106 and the vent valve 108 are generally maintained in their respective closed positions when the engine is not running.

A driver of the vehicle may add liquid fuel to the fuel tank 102. Liquid fuel may be added to the fuel tank 102 via a fuel inlet 112. A fuel cap 114 closes the fuel inlet 112. The fuel cap 114 and the fuel inlet 112 may be accessed via a fueling compartment 116. A fuel door 118 closes to shield and close the fueling compartment 116.

A fuel level sensor 120 measures amount of liquid fuel within the fuel tank 102 and generates a fuel level signal based on the amount of liquid fuel within the fuel tank 102. For example only, the amount of liquid fuel in the fuel tank 102 may be expressed in terms of a volume, a percentage of a maximum volume of the fuel tank 102, or another suitable measure of the amount of fuel in the fuel tank 102.

The ambient air provided to the canister 104 through the vent valve 108 may be drawn from the fueling compartment 116. A filter 130 receives the ambient air and filters various particulate from the ambient air. For example only, the filter 130 may filter particulate having a dimension of more than a predetermined dimension, such as greater than approximately 5 microns. Filtered air is provided to the vent valve 108.

A switching valve 132 may be implemented to enable and disable the provision of the filtered air to the vent valve 108. The switching valve 132 may be actuated to a first position, shown in the exemplary embodiment of FIG. 1, to provide the filtered air via a first air path. When the filtered air is provided to the vent valve 108 via the first air path, the filtered air may be provided from the filter 130.

The switching valve 132 may also be selectively actuated to a second position to draw air through the vent valve 108 via a second air path. A vacuum pump 134 may draw the air through the vent valve 108 and expel the air through the filter 130. The vacuum pump 134 may be used, for example, in conjunction with leak diagnostics of the purge valve 106 and/or the vent valve 108. A relief valve 136 may also be implemented and may selectively discharge the pressure or vacuum. The CM 110 may control the switching valve 132 and the vacuum pump 134.

A filtered air pressure sensor 140 measures pressure of the filtered air at a location between the filter 130 and the vent valve 108. The filtered air pressure sensor 140 generates a filtered air pressure signal based on the filtered air pressure. The filtered air pressure sensor 140 provides the filtered air pressure to the CM 110.

The CM 110 may also receive signals from other sensors, such as an ambient pressure sensor 142, an engine speed sensor 144, and a tank vacuum sensor 146. The ambient pressure sensor 142 measures pressure of the ambient air and generates an ambient air pressure signal based on the ambient air pressure.

The engine speed sensor 144 measures rotational speed of the engine and generates an engine speed signal based on the rotational speed. For example only, the engine speed sensor 144 may measure the rotational speed based on rotation of a crankshaft of the engine. The tank vacuum sensor 146 measures vacuum of the fuel tank 102 and generates a tank vacuum signal based on the tank vacuum. For example only, the tank vacuum sensor 146 may measure the tank vacuum within the canister 104. In other implementations, tank pressure may be measured, and the tank vacuum may be determined based on a difference between the tank pressure and the ambient air pressure.

Over time, particulate filtered by the filter 130 may accumulate and may restrict the flow of the ambient air through the filter 130. The CM 110 of the present disclosure may include a restriction diagnostic module 190 that selectively diagnoses restriction of airflow through the filter 130. While the restriction diagnostic module 190 is shown and discussed as being implemented within the CM 110, the restriction diagnostic module 190 may be implemented independently of the CM 110.

The restriction diagnostic module 190 diagnoses the restriction of airflow through the filter 130 based on a pressure difference across the filter 130. For example only, the restriction diagnostic module 190 selectively diagnoses the restriction of airflow through the filter 130 when the pressure difference is greater than a predetermined pressure.

When the restriction of airflow through the filter 130 has been diagnosed, the CM 110 may perform one or more remedial actions. For example only, the CM 110 may alter a predetermined memory location corresponding and/or store a predetermined code in diagnostic memory. The CM 110 may also trigger an indicator and/or perform other suitable remedial action(s). For example only, the indicator may include a malfunction indicator lamp (MIL) 196.

The indicator may, for example, be used to notify a vehicle user that it may be appropriate to seek servicing for the vehicle. Upon servicing the vehicle, a vehicle service technician may access the diagnostic memory and readily determine, from alteration to the diagnostic memory, that the filter 130 should be replaced, repaired, or otherwise serviced. This may reduce time spent by the service technician in determining which component of the fuel system 100 should be serviced and may prevent unnecessary repair or replacement of components.

Figure 2:
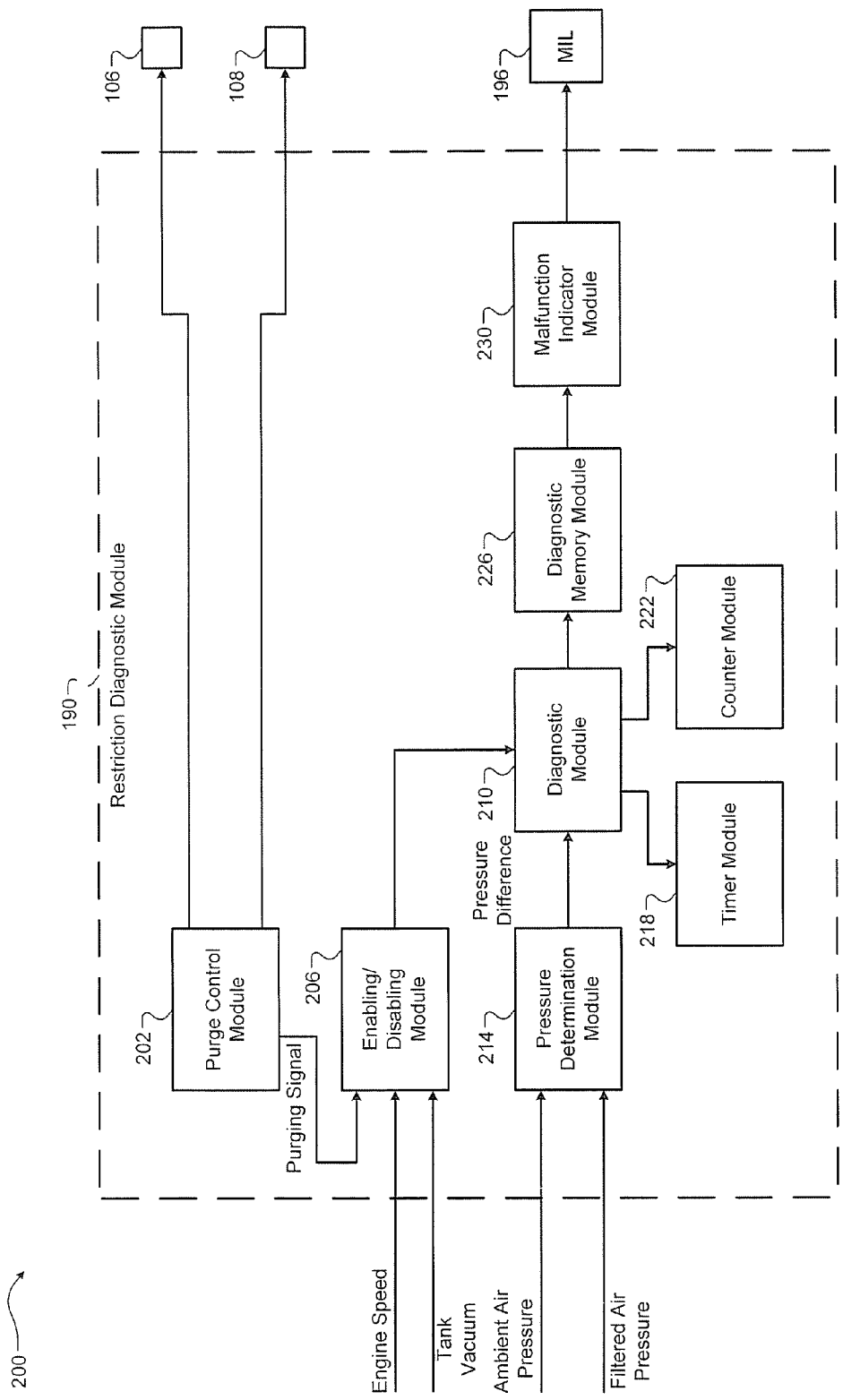
FIG. 2 is a functional block diagram of an exemplary diagnostic system according to the principles of the present disclosure.

Referring now to FIG. 2, a functional block diagram of an exemplary diagnostic system 200 is presented. The restriction diagnostic module 190 may include a purge control module 202, an enabling/disabling module 206, a diagnostic module 210, and a pressure difference module 214. The restriction diagnostic module 190 may also include a timer module 218, a counter module 222, a diagnostic memory module 226, and a malfunction indicator module 230. The purge control module 202 controls the purging of fuel vapor back from the canister 104. More specifically, the purge control module 202 controls opening and closing of the purge valve 106 and the vent valve 108.

The enabling/disabling module 206 selectively enables and disables the diagnostic module 210. The enabling/disabling module 206 selectively enables and disables the diagnostic module 210 based on whether one or more enabling conditions are satisfied. The enabling/disabling module 206 may selectively enable and disable the diagnostic module 210 based on, for example, whether fuel vapor purging is occurring, whether the engine is running, and/or the tank vacuum. For example only, the enabling/disabling module 206 may enable the diagnostic module 210 when: fuel vapor purging is occurring, the engine is running, and the tank vacuum is greater than a predetermined tank vacuum.

The enabling/disabling module 206 may determine whether fuel vapor purging is occurring based on whether a purging signal is active or inactive. The purge control module 202 may generate the purging signal and set the purging signal to active when fuel vapor purging is occurring. In other implementations, the enabling/disabling module 206 may determine whether fuel vapor purging is occurring based on the duty cycle of the signal applied to the purge valve 106, whether the vent valve 108 is in the open position, and/or another suitable parameter. For example only, the enabling/disabling module 206 may determine that fuel vapor purging is occurring when the duty cycle is greater than zero and/or when the vent valve 108 is in the open position. The enabling/disabling module 206 may determine that the engine is running when, for example, the engine speed is greater than a predetermined speed. For example only, the predetermined speed may be zero. The predetermined tank vacuum may be calibratable and may be set, for example, to approximately 12 inches of water.

The enabling/disabling module 206 selectively disables the diagnostic module 210 when one or more of the enabling conditions are not satisfied. In other words, the enabling/disabling module 206 may disable the diagnostic module 210 when fuel vapor purging is not occurring, when the engine is not running, or when the tank vacuum is less than the predetermined tank vacuum.

The diagnostic module 210 selectively diagnoses the restriction of airflow through the filter 130 based on a pressure difference. More specifically, the diagnostic module 210 selectively diagnoses the restriction of airflow through the filter 130 when the pressure difference is greater than a predetermined restriction pressure. For example only, the predetermined restriction pressure may be approximately 8 inches of water.

The pressure determination module 214 determines the pressure difference based on the ambient air pressure and the filtered air pressure. For example only, the pressure determination module 214 determines the pressure difference based on a difference between the ambient air pressure and the filtered air pressure. The pressure determination module 214 may determine the pressure difference at predetermined intervals, such as once every 100 ms. The pressure determination module 214 may also apply one or more filters and/or buffers to the pressure difference before outputting the pressure difference.

When the pressure difference exceeds the predetermined restriction pressure, the diagnostic module 210 starts a timer. The timer may be implemented, for example, within the timer module 218. The diagnostic module 210 may also reset the timer to a predetermined reset value (e.g., zero) before starting the timer. The diagnostic module 210 may also reset the timer to the predetermined reset value when the pressure difference falls below the predetermined restriction pressure. In this manner, the timer tracks how long the pressure difference has been greater than the predetermined restriction pressure.

The diagnostic module 210 may monitor the pressure difference and the timer and may diagnose the occurrence of a filter restriction error when the pressure difference is greater than the predetermined restriction pressure for a predetermined period of time. In other words, the diagnostic module 210 may diagnose the occurrence of a filter restriction error when the pressure difference is greater than the predetermined restriction pressure for the predetermined period. For example only, the predetermined period may be between approximately 10 seconds and approximately 20 seconds.

The diagnostic module 210 may alter a counter once per key cycle based on whether a filter restriction error is diagnosed during the key cycle. One key cycle may include, for example, the period of time between vehicle start up and vehicle shut down. The counter may be implemented in, for example, the counter module 222.

For example only, the diagnostic module 210 may increment the counter when a filter restriction error is diagnosed during a given key cycle. The diagnostic module 210 may reset the counter to a predetermined reset value (e.g., zero) when a filter restriction error is not diagnosed during the given key cycle. In this manner, the counter tracks the number of key cycles during which a filter restriction error has been diagnosed.

The diagnostic module 210 may monitor the counter and may selectively diagnose the restriction of airflow through the filter 130 based on the counter. For example only, the diagnostic module 210 may diagnose the restriction of airflow through the filter 130 when the counter is greater than a predetermined value. In other words, the diagnostic module 210 may diagnose the restriction of airflow through the filter 130 when a filter restriction error has been diagnosed during a predetermined number of key cycles. In various implementations, the predetermined number of key cycles may be consecutive key cycles. For example only, the predetermined value may be approximately 2, corresponding to 2 key cycles.

The diagnostic module 210 may perform one or more remedial actions when the restriction of airflow through the filter 130 is diagnosed. For example only, the diagnostic module 210 may alter the predetermined location and/or set the predetermined code in the diagnostic memory. The diagnostic memory may be implemented, for example, in the diagnostic memory module 226. The diagnostic module 210 may also alter a predetermined location and/or set a predetermined code in the diagnostic memory when a filter restriction error is diagnosed.

The malfunction indicator module 230 may monitor the diagnostic memory module 226 and may illuminate the indicator (e.g., the MIL 196) when the restriction of airflow through the filter 130 is diagnosed. In this manner, the restriction diagnostic module 190 notifies the vehicle user that it may be appropriate to seek vehicle service. The diagnostic memory module 226 may be accessed and, based on the alteration of the diagnostic memory, it may be readily determined that the filter 130 through which airflow is likely restricted should be replaced or repaired.

Figure 3:
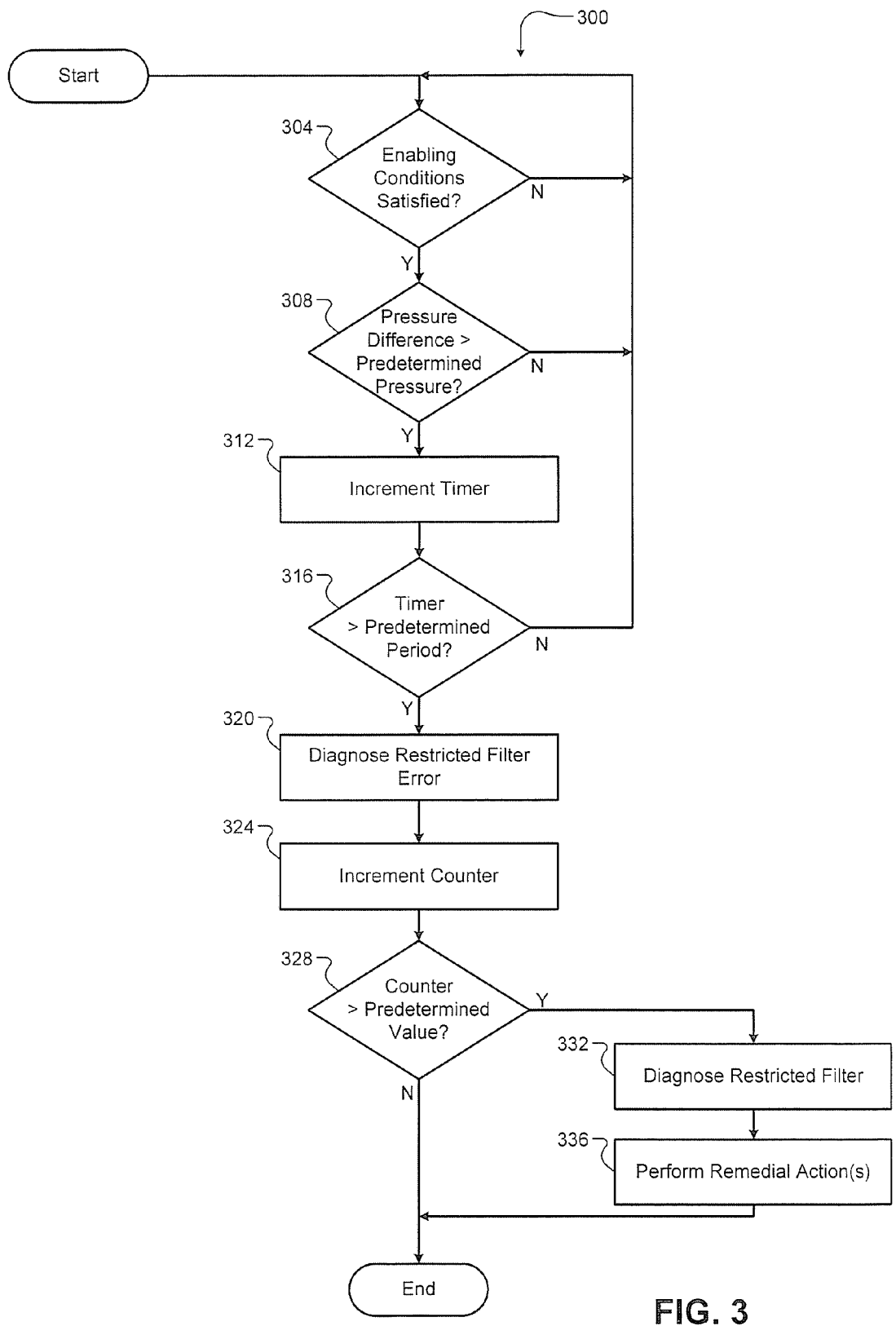
FIG. 3 is a flowchart depicting exemplary steps performed by a method according to the principles of the present disclosure.

Referring now to FIG. 3, a flowchart depicting exemplary steps performed by a method 300 is presented. Control may begin in step 304 where control determines whether the enabling conditions are satisfied. If true, control may proceed to step 308; if false, control may remain in step 304. For example only, the enabling conditions may be deemed satisfied when fuel vapor purging is occurring, when the engine is running, and when the tank vacuum is greater than the predetermined tank vacuum. For example only, the predetermined tank vacuum may be approximately 12 inches of water.

In step 308, control determines whether the pressure difference is greater than the predetermined restriction pressure. If true, control may proceed to step 312; if false, control may return to step 304. For example only, the predetermined restriction pressure may be approximately 8 inches of water. Control increments the timer in step 312 and determines whether the timer is greater than the predetermined period in step 316. If true, control proceeds to step 320; if false, control returns to step 304. For example only, the predetermined period may be between approximately 10 seconds and approximately 20 seconds.

Control diagnoses the occurrence of a restricted filter air in step 320. In this manner, control diagnoses the occurrence of a restricted filter error when the pressure difference is greater than the predetermined restriction pressure for the predetermined period of time. Control increments the counter in step 324, and control determines whether the counter is greater than the predetermined value in step 328. In other words, control determines whether a restricted filter error has occurred during the predetermined number of key cycles in step 328. If true, control diagnoses the restriction of airflow through the filter 130 in step 332, and control performs remedial action(s) in step 336. If false, control may end. For example only, the remedial actions taken in step 336 may include altering the predetermined location in the diagnostic memory, setting the predetermined code in the diagnostic memory, and/or triggering the indicator (e.g., the MIL 196).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A restriction diagnostic system for a vehicle, comprising:
   a pressure difference module that determines a pressure difference between an ambient air pressure and a filtered air pressure measured at a location between an air filter and a valve that is selectively opened to enable ambient airflow through the air filter to a fuel vapor canister; and
   a diagnostic module that selectively diagnoses restriction of the airflow through the air filter when the pressure difference is greater than a predetermined pressure,
   wherein the diagnostic module diagnoses a restricted filter error when the pressure difference is greater than the predetermined pressure for a predetermined period and selectively diagnoses the restriction of the airflow through the air filter when a predetermined number of restricted filter errors are diagnosed during a predetermined number of key cycles of the vehicle.

2. The restriction diagnostic system of claim 1 wherein the diagnostic module diagnoses the restriction of the airflow through the air filter when the predetermined number of restricted filter errors are diagnosed during the predetermined number of consecutive key cycles of the vehicle.

3. The restriction diagnostic system of claim 1 wherein the diagnostic module selectively alters diagnostic memory when the restriction of the airflow through the air filter is diagnosed.

4. The restriction diagnostic system of claim 1 wherein the diagnostic module triggers an indicator when the restriction of the airflow through the air filter is diagnosed.

5. The restriction diagnostic system of claim 1 wherein the diagnostic module illuminates a malfunction indicator lamp (MIL) when the restriction of the airflow through the air filter is diagnosed.

6. The restriction diagnostic system of claim 1 further comprising an enabling/disabling module that disables the diagnostic module when fuel vapor purging from the fuel vapor canister to an engine is disabled.

7. The restriction diagnostic system of claim 1 further comprising an enabling/disabling module that disables the diagnostic module when an engine speed is zero.

8. The restriction diagnostic system of claim 1 further comprising an enabling/disabling module that disables the diagnostic module when a fuel tank vacuum is less than a predetermined tank vacuum.

9. A restriction diagnostic method for a vehicle, comprising:
   determining a pressure difference between an ambient air pressure and a filtered air pressure measured at a location between an air filter and a valve that is selectively opened to enable ambient airflow through the air filter to a fuel vapor canister;
   selectively diagnosing restriction of the airflow through the air filter when the pressure difference is greater than a predetermined pressure;
   diagnosing a restricted filter error when the pressure difference is greater than the predetermined pressure for a predetermined period; and
   diagnosing the restriction of the airflow through the air filter when a predetermined number of restricted filter errors are diagnosed during a predetermined number of key cycles of the vehicle.

10. The restriction diagnostic method of claim 9 wherein the diagnosing the restriction of the airflow through the air filter comprises diagnosing the restriction of the airflow through the air filter when the predetermined number of restricted filter errors are diagnosed during the predetermined number of consecutive key cycles of the vehicle.

11. The restriction diagnostic method of claim 9 further comprising selectively altering diagnostic memory when the restriction of the airflow through the air filter is diagnosed.

12. The restriction diagnostic method of claim 9 further comprising triggering an indicator when the restriction of the airflow through the air filter is diagnosed.

13. The restriction diagnostic method of claim 9 further comprising illuminating a malfunction indicator lamp (MIL) when the restriction of the airflow through the air filter is diagnosed.

14. The restriction diagnostic method of claim 9 further comprising disabling the diagnosing when fuel vapor purging from the fuel vapor canister to an engine is disabled.

15. The restriction diagnostic method of claim 9 further comprising disabling the diagnosing when an engine speed is zero.

16. The restriction diagnostic method of claim 9 further comprising disabling the diagnosing when a fuel tank vacuum is less than a predetermined tank vacuum.

17. A restriction diagnostic system for a vehicle, comprising:
a pressure difference module that determines a pressure difference between an ambient air pressure and a filtered air pressure measured at a location between an air filter and a valve that is selectively opened to enable ambient airflow through the air filter to a fuel vapor canister;
a diagnostic module that selectively diagnoses restriction of the airflow through the air filter when the pressure difference is greater than a predetermined pressure; and
an enabling/disabling module that disables the diagnostic module when at least one of:
fuel vapor purging from the fuel vapor canister to an engine is disabled; and
a fuel tank vacuum is less than a predetermined tank vacuum.

18. The restriction diagnostic system of claim 17 wherein the diagnostic module selectively alters diagnostic memory when the restriction of the airflow through the air filter is diagnosed.

19. The restriction diagnostic system of claim 17 wherein the diagnostic module triggers an indicator when the restriction of the airflow through the air filter is diagnosed.

20. The restriction diagnostic system of claim 17 wherein the diagnostic module illuminates a malfunction indicator lamp (MIL) when the restriction of the airflow through the air filter is diagnosed.

21. The restriction diagnostic system of claim 17 wherein the enabling/disabling module disables the diagnostic module when at least one of:
fuel vapor purging from the fuel vapor canister to the engine is disabled;
the fuel tank vacuum is less than the predetermined tank vacuum; and
an engine speed is zero.

22. The restriction diagnostic system of claim 17 wherein the diagnostic module diagnoses a restricted filter error when the pressure difference is greater than the predetermined pressure for a predetermined period and selectively diagnoses the restriction of the airflow through the air filter when the restricted filter error is diagnosed.

23. The restriction diagnostic system of claim 22 wherein the diagnostic module diagnoses the restriction of the airflow through the air filter when a predetermined number of restricted filter errors are diagnosed during a predetermined number of key cycles of the vehicle.

24. The restriction diagnostic system of claim 22 wherein the diagnostic module diagnoses the restriction of the airflow through the air filter when a predetermined number of restricted filter errors are diagnosed during a predetermined number of consecutive key cycles of the vehicle.

25. A restriction diagnostic method for a vehicle, comprising:
determining a pressure difference between an ambient air pressure and a filtered air pressure measured at a location between an air filter and a valve that is selectively opened to enable ambient airflow through the air filter to a fuel vapor canister;
selectively diagnosing restriction of the airflow through the air filter when the pressure difference is greater than a predetermined pressure; and
disabling the diagnosing when at least one of:
fuel vapor purging from the fuel vapor canister to an engine is disabled; and
a fuel tank vacuum is less than a predetermined tank vacuum.

26. The restriction diagnostic method of claim 25 further comprising selectively altering diagnostic memory when the restriction of the airflow through the air filter is diagnosed.

27. The restriction diagnostic method of claim 25 further comprising triggering an indicator when the restriction of the airflow through the air filter is diagnosed.

28. The restriction diagnostic method of claim 25 further comprising illuminating a malfunction indicator lamp (MIL) when the restriction of the airflow through the air filter is diagnosed.

29. The restriction diagnostic method of claim 25 further comprising disabling the diagnosing when an engine speed is zero.

30. The restriction diagnostic method of claim 25 further comprising:
diagnosing a restricted filter error when the pressure difference is greater than the predetermined pressure for a predetermined period; and
selectively diagnosing the restriction of the airflow through the air filter when the restricted filter error is diagnosed.

31. The restriction diagnostic method of claim 30 further comprising diagnosing the restriction of the airflow through the air filter when a predetermined number of restricted filter errors are diagnosed during a predetermined number of key cycles of the vehicle.

32. The restriction diagnostic method of claim 30 further comprising diagnosing the restriction of the airflow through the air filter when a predetermined number of restricted filter errors are diagnosed during a predetermined number of consecutive key cycles of the vehicle.

* * * * *